United States Patent
Jin et al.

(10) Patent No.: US 11,410,176 B2
(45) Date of Patent: Aug. 9, 2022

(54) SYSTEM AND METHOD FOR ENHANCED DETECTION OF FRAUDULENT ELECTRONIC TRANSACTIONS

(71) Applicant: TigerGraph, Inc., Redwood City, CA (US)

(72) Inventors: Ruoming Jin, Kent, OH (US); Ming Lin, Great Neck, NY (US); Yu Xu, Mountain View, CA (US); Adam P. Anthony, Kent, OH (US); Victor E. Lee, Kent, OH (US)

(73) Assignee: TIGERGRAPH, INC., Redwood City, CA (US)

( * ) Notice: Subject to any disclaimer, the term of this patent is extended or adjusted under 35 U.S.C. 154(b) by 552 days.

(21) Appl. No.: 14/750,743

(22) Filed: Jun. 25, 2015

(65) Prior Publication Data

US 2015/0379517 A1     Dec. 31, 2015

Related U.S. Application Data

(60) Provisional application No. 62/018,250, filed on Jun. 27, 2014.

(51) Int. Cl.
*G06Q 20/40* (2012.01)
*G06Q 40/02* (2012.01)

(52) U.S. Cl.
CPC ....... *G06Q 20/4016* (2013.01); *G06Q 20/405* (2013.01); *G06Q 40/02* (2013.01)

(58) Field of Classification Search
CPC .......... G06Q 20/4014; G06Q 20/4016; G06Q 40/00; G06Q 40/025; G06Q 20/12;

(Continued)

(56) References Cited

U.S. PATENT DOCUMENTS 3,850,299 A * 11/1974 Kreitzer ................. G06K 13/08
                                                                  209/919
3,858,186 A * 12/1974 Barker .................... G06K 1/126
                                                                  365/127

(Continued)

FOREIGN PATENT DOCUMENTS

CN            101073219 A     11/2007

OTHER PUBLICATIONS

CN, First Office Action, Application No. 201510369774.6, dated Sep. 27, 2018.

(Continued)

*Primary Examiner* — Slade E Smith
(74) *Attorney, Agent, or Firm* — Orrick, Herrington & Sutcliffe LLP

(57) ABSTRACT

Systems and methods for enhanced detection of fraudulent electronic transactions are disclosed. In one embodiment, a system uses the ongoing stream of transactions to construct and maintain a dynamically evolving merchant relationship graph. When a proposed transaction is submitted to the system, the system computes a predicted likelihood that the given account would make a transaction with these characteristics with the given merchant. The graph is used to compute transitive relatedness between merchants which may be indirectly associated with one another, as well as to compute aggregate relatedness, when there are multiple avenues of relationship between two merchants.

20 Claims, 14 Drawing Sheets

MERCHANT RELATIONSHIP GRAPH (305)

770: MERCHANT RELATIONSHIP VALIDATOR 202
COMPUTES SINGLE EDGE FUNCTION VALUES:
f(m1,m2) = 2
f(m1,m3) = 3
f(m2,m3) = 5
f(m2,m4) = 1
f(m3,m4) = 1

772: MERCHANT RELATIONSHIP VALIDATOR 202
COMPUTES LENGTH 2 FUNCTION VALUES:
f(m1,m2, via m2) = min(3,5)-1 = 2
f(m1,m3, via m2) = min(2,5)-1 = 1
f(m2,m3, via m4) = min(1,1)-1 = 0
f(m2,m3, via m1) = min(2,3)-1 = 1
f(m2,m4, via m3) = min(5,1)-1 = 0
f(m3,m4, via m2) = min(5,1)-1 = 0
f(m1,m4, via m2) = min(2,1)-1 = 0
f(m1,m4, via m3) = min(3,1)-1 = 0

774: MERCHANT RELATIONSHIP VALIDATOR 202
AGGREGATES PATHS IN PARALLEL:
f(m1,m2, all) = max(2, 2)+1 = 3
f(m1,m3, all) = max(3, 1)+1 = 4
f(m2,m3, all) = max(5, 0, 1)+1 = 6
f(m2,m4, all) = max(1, 0)+1 = 2
f(m3,m4, all) = max(1, 0)+1 = 2
f(m1,m4, all) = max(0, 0)+1 = 1

(58) Field of Classification Search
CPC .. G06Q 20/401; G06Q 10/0635; G06Q 20/10; G06Q 20/3674; G06Q 20/3829; G06Q 20/40; G06Q 30/0185; G06Q 30/02; G06Q 30/06; G06Q 30/0601; G06Q 30/0609; G06Q 40/08; G06Q 20/322; G06Q 20/02; G06Q 20/04; G06Q 20/14; G06Q 20/24; G06Q 20/352; G06Q 20/4018; G06Q 20/405; G06Q 30/0201; H04L 2209/56; H04L 2209/805; H04L 9/3234
USPC .......................................................... 705/44
See application file for complete search history.

(56) References Cited

U.S. PATENT DOCUMENTS

| | | | | |
|---|---|---|---|---|
| 4,700,055 | A * | 10/1987 | Kashkashian, Jr. .. | G06Q 20/363 902/4 |
| 5,268,963 | A * | 12/1993 | Monroe ................ | G07C 9/253 713/186 |
| 5,659,740 | A * | 8/1997 | Ezaki .................... | G06Q 99/00 715/239 |
| 5,953,728 | A * | 9/1999 | Horowitz ............ | G06F 16/2358 707/999.102 |
| 6,230,166 | B1 * | 5/2001 | Velamuri ............. | H04Q 3/005 379/221.13 |
| 7,231,397 | B2 * | 6/2007 | Madhavarapu ..... | G06F 16/1865 707/999.102 |
| 9,665,729 | B2 * | 5/2017 | Bruno .................. | G06F 21/6209 |
| 2003/0070080 | A1 * | 4/2003 | Rosen .................. | G06Q 20/381 713/187 |
| 2003/0187778 | A1 * | 10/2003 | Sgaraglio ............ | G06Q 40/025 705/38 |
| 2005/0091187 | A1 * | 4/2005 | Madhavarapu ..... | G06F 16/1865 |
| 2005/0192891 | A1 | 9/2005 | Ferrera et al. | |
| 2007/0198432 | A1 * | 8/2007 | Pitroda ................ | G06Q 20/325 705/64 |
| 2007/0246528 | A1 * | 10/2007 | Kubo .................... | G06Q 20/403 235/380 |
| 2007/0288641 | A1 * | 12/2007 | Lee ........................ | G06Q 40/08 709/227 |
| 2008/0040265 | A1 * | 2/2008 | Rackley, III ........ | G06Q 20/3255 705/40 |
| 2008/0262961 | A1 * | 10/2008 | Dellomo ............... | G06Q 40/00 705/38 |
| 2008/0288405 | A1 * | 11/2008 | John .................... | G06Q 20/386 705/44 |
| 2009/0288012 | A1 * | 11/2009 | Hertel .................. | G06Q 20/105 715/769 |
| 2010/0088083 | A1 * | 4/2010 | Leeland ............... | G06F 30/367 703/14 |
| 2010/0106611 | A1 * | 4/2010 | Paulsen ................ | G07F 17/32 705/40 |
| 2011/0066672 | A1 * | 3/2011 | Zamarreno ............ | G06F 9/466 709/203 |
| 2011/0276467 | A1 * | 11/2011 | Blackburn ........... | G06Q 40/025 705/38 |
| 2011/0288685 | A1 * | 11/2011 | Usem ..................... | G07F 9/006 70/159 |
| 2012/0084135 | A1 * | 4/2012 | Nissan ................ | G06Q 30/0238 705/14.38 |
| 2012/0109903 | A1 * | 5/2012 | Freedman ........... | G06F 16/1873 707/690 |
| 2012/0297394 | A1 * | 11/2012 | Allen .................... | G06F 9/4881 718/103 |
| 2013/0246120 | A1 * | 9/2013 | Chang ................. | G06Q 30/0201 705/7.29 |
| 2013/0339703 | A1 * | 12/2013 | Alexander ............ | G06F 9/52 712/244 |
| 2014/0249946 | A1 * | 9/2014 | Balasubramanian ........ G06Q 20/4016 705/21 |
| 2014/0310483 | A1 * | 10/2014 | Bennett ................ | G06F 3/0644 711/154 |
| 2015/0149350 | A1 * | 5/2015 | Ananda Kumar ... | G06Q 20/407 705/40 |
| 2015/0161609 | A1 * | 6/2015 | Christner ............ | G06Q 20/4016 705/44 |
| 2015/0170148 | A1 * | 6/2015 | Priebatsch ........... | G06Q 20/386 705/44 |
| 2015/0242439 | A1 * | 8/2015 | Freedman .............. | G06F 9/466 707/703 |
| 2015/0242834 | A1 * | 8/2015 | Goldsmith ........... | G06Q 20/405 705/39 |
| 2015/0293820 | A1 * | 10/2015 | Doshi ................. | G06F 16/2358 711/162 |
| 2016/0224949 | A1 * | 8/2016 | Thomas ................ | G06Q 20/02 |

OTHER PUBLICATIONS

CN, First Office Action, Application No. 201510369774.6, dated Mar. 13, 2020.
CN, Third Office Action, Application No. 201510369774.6, dated Aug. 11, 2020.
CN, Fourth Office Action, Application No. 201510369774.6, dated Feb. 1, 2021.

* cited by examiner

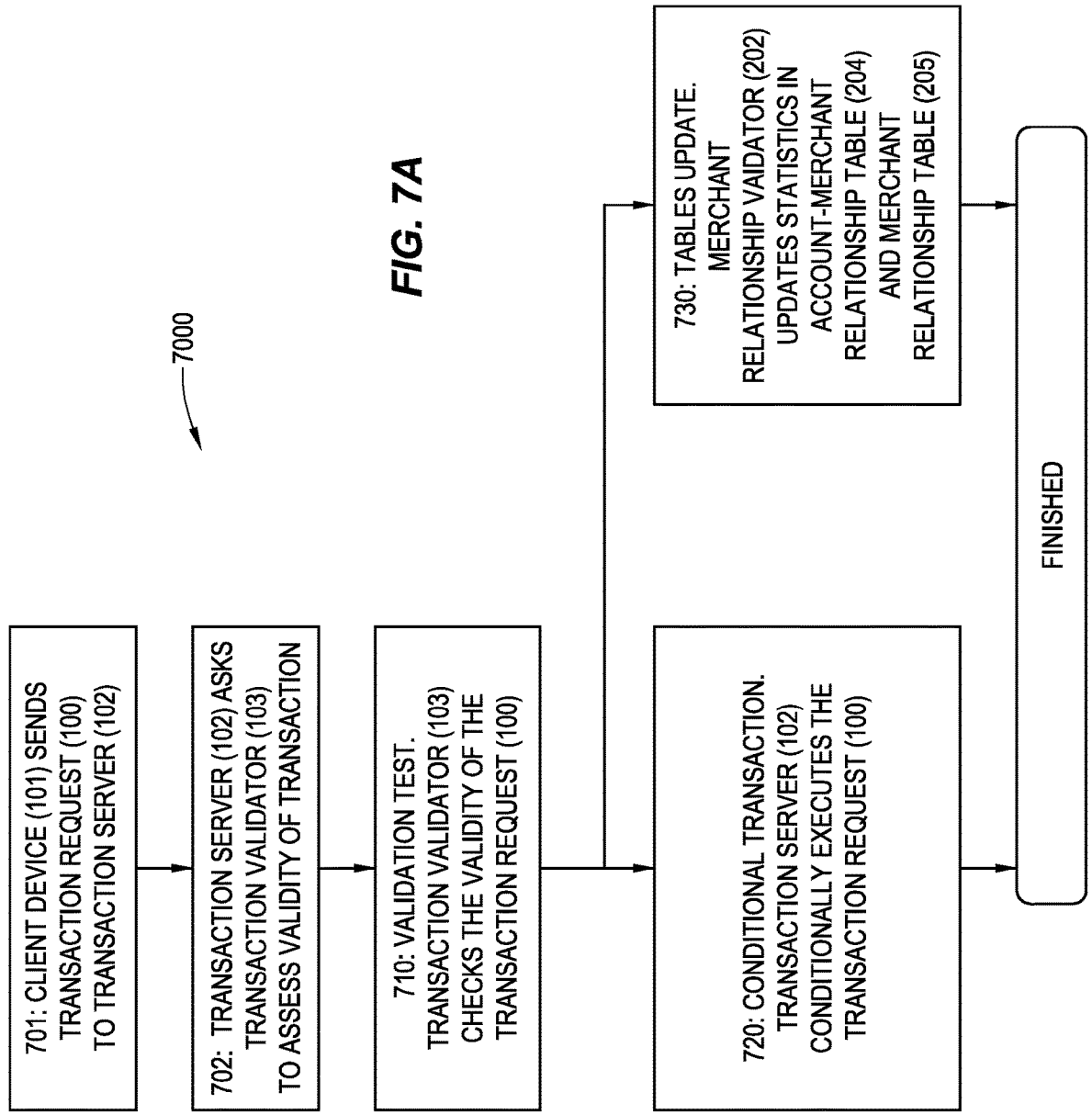

SYSTEM AND METHOD FOR ENHANCED DETECTION OF FRAUDULENT ELECTRONIC TRANSACTIONS

CROSS-REFERENCE TO RELATED APPLICATIONS

This application claims priority to U.S. provisional patent application, Ser. No. 62/018,250, filed on Jun. 27, 2014. Priority to the provisional application is expressly claimed, and the disclosure of the application is hereby incorporated herein by reference in its entirety and for all purposes.

FIELD

The present disclosure relates generally to graph based relationships and more specifically, but not exclusively, to enhanced detection of fraudulent electronic transactions based on relationship graphs.

BACKGROUND

Both commercial and law-enforcement organizations have a vital interest in determining whether some attempted financial transactions are fraudulent. In this context, fraudulent means that a purchaser does not have legitimate authority to use funds involved in the transaction. As an example, the purchaser may be using a stolen identity and/or using funds (or privileges) that properly belong to the entity whose identity has been stolen. Such funds include a credit card account, a debit card account, an online banking account, and an e-commerce site-issued online account.

It is difficult to detect all fraudulent transactions using conventional systems and methods. There are not only several types of fraud, but also the nature of fraudulent activity is that it is disguised. For example, purchase fraud includes using stolen accounts, creation of new accounts, using a false identity, and demonstrating chargeback fraud (e.g., demanding a refund). In other cases, the merchant is the fraud perpetrator: billing excess charges, failing to deliver products, or not existing as a legitimate business. Accordingly, conventional systems for detecting fraudulent transactions typically use an assemblage of methods, each of which detects and assesses some attribute which distinguishes transactions that are likely valid from likely fraudulent.

Various schemes have been used to detect or block fraudulent transactions. These schemes include using a secret password, a biometric identifier, a monetary limit, and examining the pattern of transactions. The first three methods (i.e., using secret passwords, biometric identifiers, and monetary limits) provide simple pass-fail tests. However, passwords and biometrics often are not used for credit card transactions because legitimate customers and vendors find them to be too troublesome or unpleasant. Setting a maximum monetary limit is flawed because it can allow many small fraudulent transactions while also blocking large but legitimate transactions.

A particular problem for current fraud detection systems is adequately following and modeling the complex patterns of online commerce. As online shopping and other transactional activity becomes easier, more common, and more global, users are engaging in ever more complex transactional patterns with regard to which merchants receive their business. The transactional patterns amount to a social network, with some shoppers referring peer shoppers to particular merchants, and with some shoppers intentionally (or unintentionally) emulating the shopping characteristics of like-minded shoppers. Two merchants can be related, not necessarily because they sell similar products, but because they are both used by many shoppers.

Many common fraud detection schemes perform a time-consuming analysis of their full set of transactional data, to try to define global rules, so that the same rules would apply to all shoppers or financial accounts. This approach not only misses fast-moving changes in shopping behavior, but also fails to allow for the legitimate differences in shopper behavior. If the fraud detection rules are individualized, they typically only include parameterized versions of a single filtering or rule model.

In view of the foregoing, a need exists for an improved system that leverages the constantly changing social network and social role behavior of electronic transactions to better measure the likelihood that a legitimate user would submit a transaction to the specified merchant in an effort to overcome the aforementioned obstacles and deficiencies of conventional fraud detection systems.

BRIEF DESCRIPTION OF THE DRAWINGS

FIG. 7A is an exemplary flowchart illustrating one embodiment of a method of validation using the fraud detection system of FIG. 1.

Figure 1:
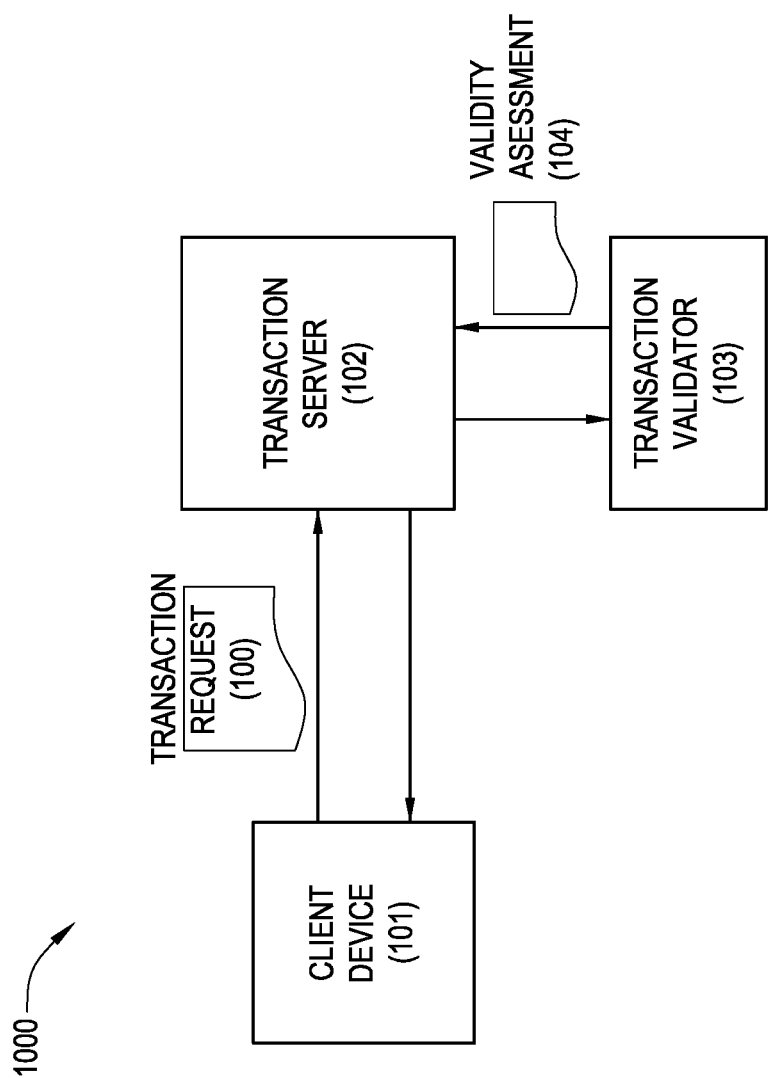
FIG. 1 is an exemplary top-level block diagram illustrating an embodiment of a fraud detection system.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE
PREFERRED EMBODIMENTS

Since currently-available fraud detection systems are deficient because they fail to capture the rapidly changing and complex social network-like nature of purchaser-merchant behavior, a fraud detection system that provides a dynamically evolving merchant relationship graph can prove desirable and provide a basis for a wide range of fraud detection applications, such as the ability to predict the likelihood that a given account would make a transaction with a given merchant. This result can be achieved, according to one embodiment disclosed herein, by a fraud detection system 1000 as illustrated in FIG. 1.

Turning to FIG. 1, the fraud detection system 1000 includes a client device 101 in communication with a transaction server 102. A customer can submit a transaction request 100 from the client device 101 to the transaction server 102. The client device 101 is any network-connected device through which the customer can submit a transaction to the transaction server 102. For example, the client device 101 includes specialized devices, such as bank automated teller machines (ATMs) and point-of-sale (POS) devices, as well as personal computers and mobile phones. The transaction server 102 is any network-connected device equipped to accept the transaction request 100 from the client device 102. For example, the transaction server 102 includes web application servers and database servers.

The fraud detection system 1000 further includes a transaction validator 103 in communication with the transaction server 102. In some embodiments, the transaction server 102 and the transaction validator 103 are components within the same computer. In other embodiments, the transaction server 102 and the transaction validator 103 are disposed within separate computers and communicate with one another via a network connection (not shown).

In some embodiments, the transaction request 100 contains information equivalent to a Financial Account ID (FID), a Merchant ID (MID), and a monetary amount (AMT). In some embodiments, the transaction request 100 contains information, such as a timestamp (TIME) and a description of any goods to be exchanged (DESC).

The transaction server 102 receives the transaction request 100 and forwards the transaction request 100 to the transaction validator 103. The transaction validator 103 performs a real-time analysis of the transaction request 100 to predict the likelihood that the transaction request 100 is fraudulent. The transaction validator 103 uses this predicted likelihood to generate a validity assessment 104, which the transaction validator 103 sends back to the transaction server 102. In some embodiments, the validity assessment 104 can have one of two values: "Valid" or "Invalid." If the validity assessment 104 is "Valid," then the transaction server 102 proceeds with executing the transaction request 100. If the validity assessment 104 is "Invalid," then the transaction server 102 will not execute the transaction request 100. If the transaction of transaction request 100 already has been started, the transaction is rolled back. Here, rolling back refers to the reversal of any parts of the transaction operations requested in transaction request 100 that may have already taken place. In either case, the transaction server 102 replies to the client device 101, indicating whether the transaction succeeded or failed.

Figure 2:
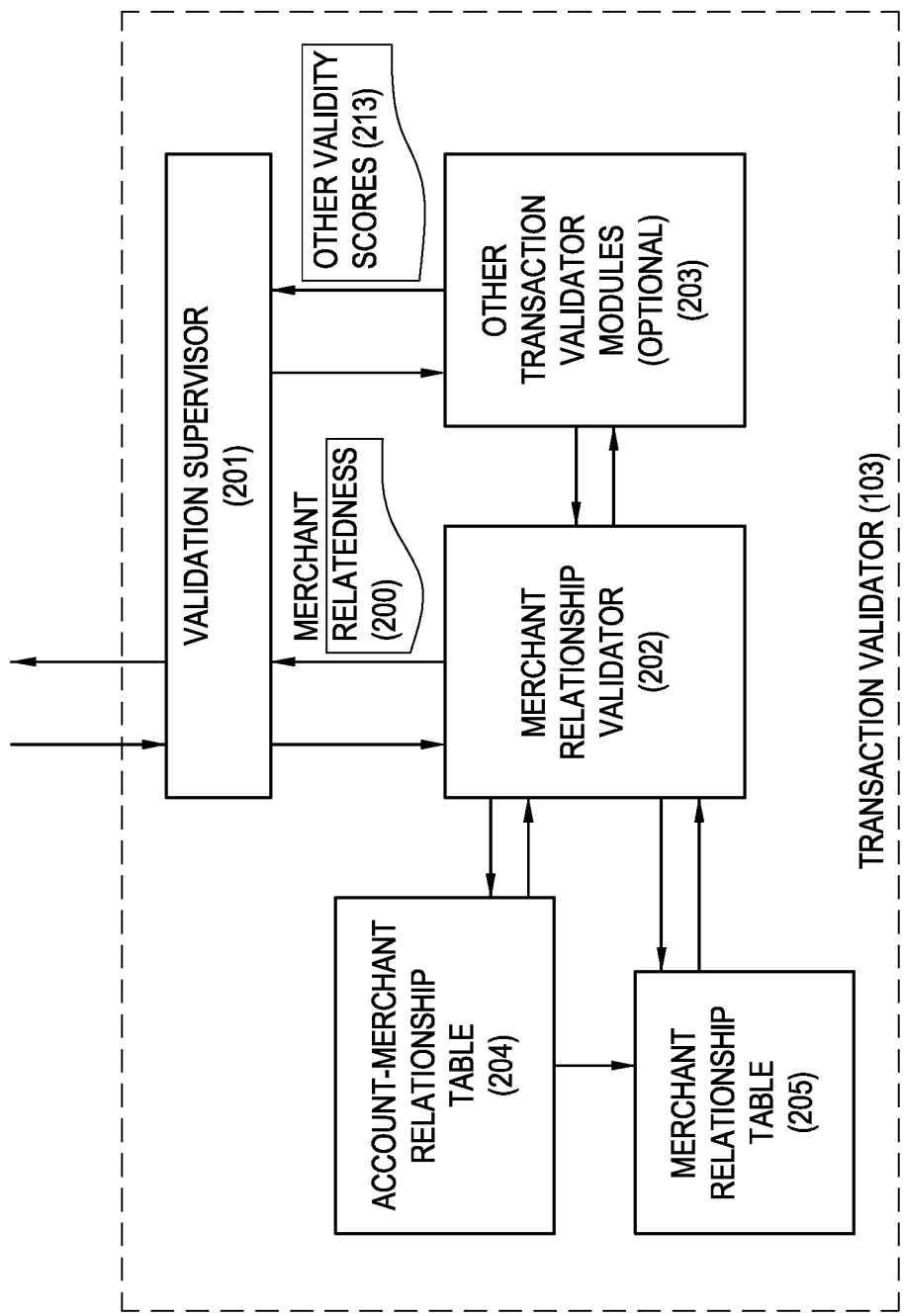
FIG. 2 is an exemplary top-level block diagram illustrating one embodiment of the transaction validator of the fraud detection system of FIG. 1.

Turning now to FIG. 2, the transaction validator 103 can include any number of components as desired. For example, as shown in FIG. 2, the transaction validator 103 includes a merchant relationship validator 202, an account-merchant relationship table 204 and a merchant relationship table 205. In an alternative embodiment, there are optional transaction validator modules 203. The optional transaction validator modules 203 can perform a fraud risk assessment of the values of any, or all, of the following fields that can be included in the transaction request 100: the Financial Account ID (FID), the Merchant ID (MID), the monetary amount (AMT), and a timestamp (TIME). If the transaction request 100 contains additional fields, such as an account holder name, email address, a web domain name of the transaction requester's organization or of the merchant business, or an IP address, these may also be used in a fraud risk assessment. In some embodiments, the optional transaction validator modules 203 compare the identifying information in the transaction request 100, such as any or all of FID, MID, an account holder name, an email address of the account holder, the web domain, and an IP address, against lists of identities that historically have been known or suspected to be involved with fraud. In some embodiments, the optional transaction validator modules 203 check to see how much the field values in the transaction request 100 deviate from the historically typical values for the particular user or account. For example, if account A1 historically has only made purchases less than $200, but in a particular transaction request 100, A1's amount is over $5000, the optional transaction validator modules 203 may determine that the particular transaction request 100 has a higher fraud risk and will therefore assign the validity score 213 a False value (if Boolean) or a low number (if numeric).

A validation supervisor 201 is responsible for coordinating the merchant relationship validator 202 with any other transaction validator modules 203 to generate a single response to the transaction server 102. The validation supervisor 201 will forward a copy of the transaction request 100 to the merchant relationship validator 202 and to the other transaction validator modules 203.

The merchant relationship validator 202 creates, maintains, and analyzes the account-merchant relationship table 204 and the merchant relationship table 205 in order to provide enhanced assessment of the fraud risk of transaction request 100. The merchant relationship validator 202 reports its assessment in the form of a merchant relatedness score 200.

Figure 3:
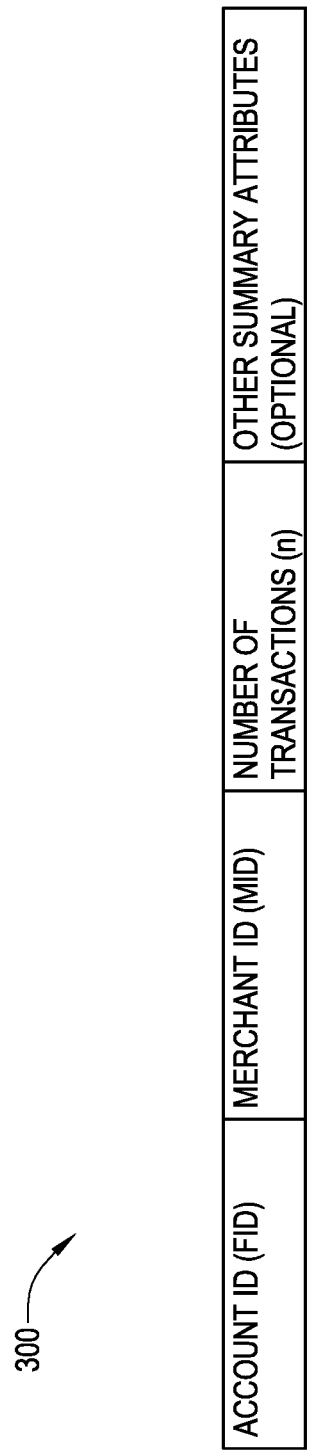
FIG. 3 is an exemplary diagram illustrating an embodiment of an account-merchant relationship table that can be stored in the transaction validator of FIG. 2.
Figure 4A:
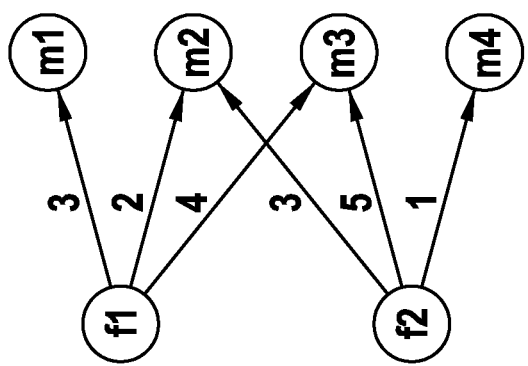
FIG. 4A is an exemplary diagram illustrating another embodiment of the account-merchant relationship table that can be stored in the transaction validator of FIG. 2.

The account-merchant relationship table 204 stores a summary of the transactions between financial accounts and merchants. For example, a sample data entry 300 that can be stored in the account-merchant relationship table 204 is shown in FIG. 3. As illustrated, each sample data entry 300 (e.g., a row) in the account-merchant relationship table 204 contains fields for FID, MID, and a count of transactions between the financial accounts and merchants. In an alternative embodiment, the account-merchant relationship table 204 contains attribute fields, such as an average and maximum size of financial transactions. Each row in this table can be interpreted as an edge in an account-merchant bipartite graph 304, such as shown in FIG. 4A. Stated in another way, the collection of one or more sample data entries 300 that can be stored in the account-merchant relationship table 204 is analogous to the account-merchant bipartite graph 304.

Figure 4B:
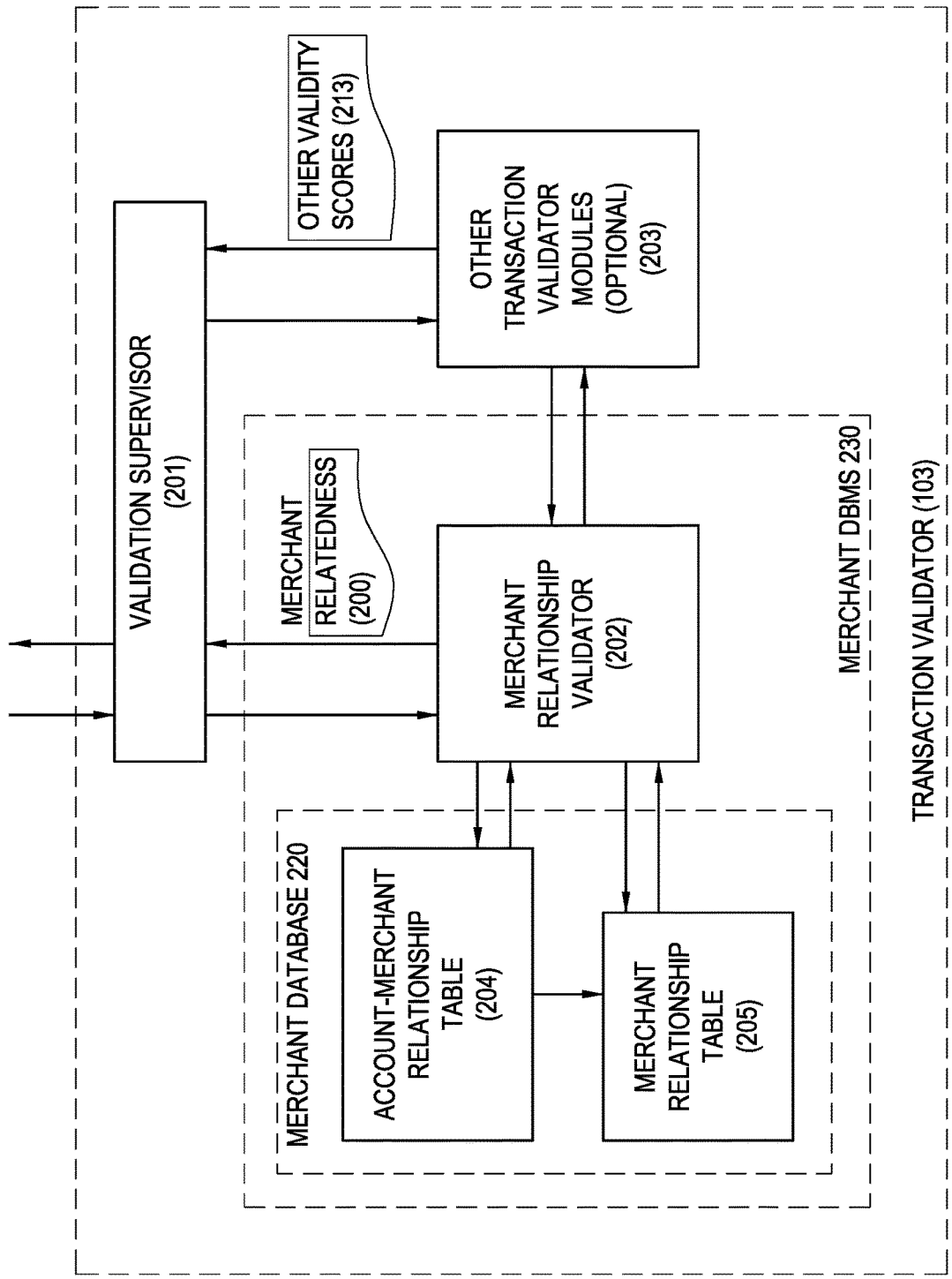
FIG. 4B is an exemplary top-level block diagram illustrating another embodiment of the transaction validator of the fraud detection system of FIG. 1.

Turning to FIG. 4B, in some embodiments, the account-merchant relationship table 204 and the merchant relationship table 205 are data structures within a database (such as a merchant database 220). In one embodiment, the account-merchant relationship table 204 and the merchant relationship table 205 are tables in a relational database. In an alternative embodiment, the account-merchant relationship table 204 and the merchant relationship table 205 are graph structures within a graph database. In yet another embodiment, the merchant relationship validator 202 can be implemented as database programs within a database management system (such as a merchant database management system (DBMS) 230).

Figure 5:
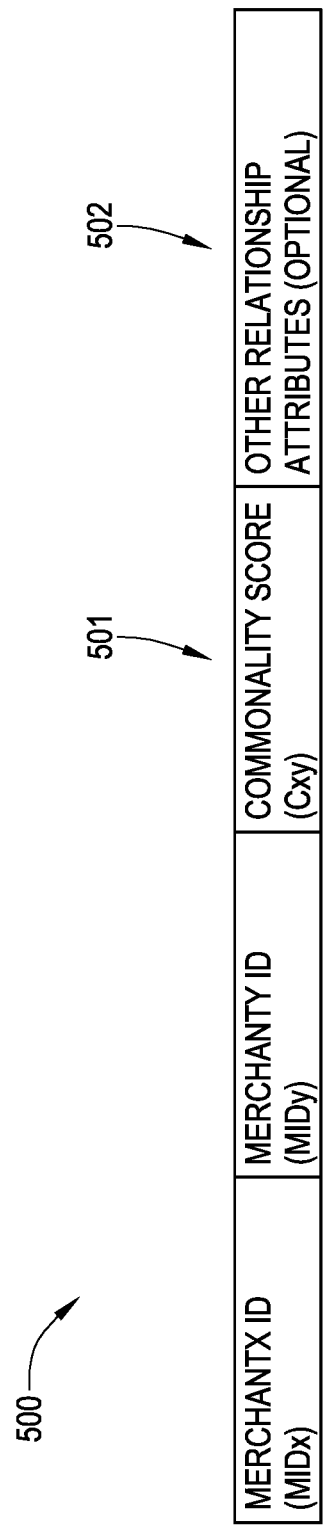
FIG. 5 is an exemplary diagram illustrating an embodiment of a merchant relationship table that can be stored in the transaction validator of FIG. 2.
Figure 6:
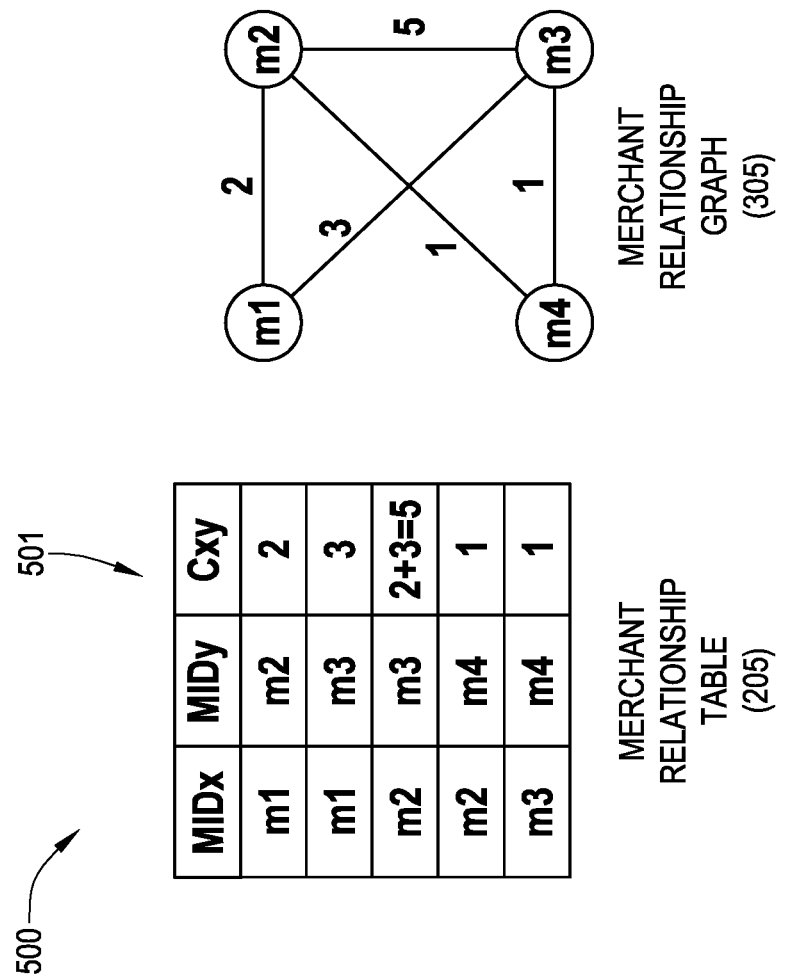
FIG. 6 is an exemplary diagram illustrating another embodiment of the merchant relationship table that can be stored in the transaction validator of FIG. 2.

The merchant relationship table 205 can be a data table having entries that store one or more relationship attributes between two merchants. For example, a sample data entry 500 that can be stored in the merchant relationship table 205 is shown in FIG. 5. As illustrated, each sample data entry 500 (e.g., a row) in the merchant relationship table 205 contains fields for the relationship attributes: a commonality score 501 and optional other relationship attributes 502. Each data entry 500 in merchant relationship table 205 can be interpreted as an edge in a merchant relationship graph 305, as shown in FIG. 6. The commonality score 501 between merchants mx and my in merchant relationship table 205 is equal to the edge weight for edge (mx, my) in merchant relationship graph 305. Stated in another way, the merchant relationship table 205 is informationally analogous to the merchant relationship graph 305.

When the transaction server 102 receives the transaction request 100, the transaction server 102 can perform a full fraud-detecting and transaction-servicing method according to any method described herein, including a fraud detection method 7000 shown in FIG. 7A.

Turning to FIG. 7A, the fraud detection method 7000 begins with the client device 101 submitting the transaction request 100 (e.g., for an account fi to a merchant mx) to the transaction server 102 (step 701).

In step 702, the transaction server 102 requests that the transaction validator 103 assess the validity of transaction request 100.

When the transaction validator 103 receives the transaction request 100 from the transaction server 102, the transaction validator 103 begins the validation test 710 (which will be described further below). The transaction validator 103 concludes the validation test 710 by sending its validity assessment 104 to the transaction server 102.

After performing the validation test 710, the transaction server 102 conditionally executes the transaction request (step 720).

Also after performing the validation test 710, the merchant relationship validator 202 then uses the data from the transaction request 100 to update the statistics recorded in the account-merchant relationship table 204 and the merchant relationship table 205 (step 730).

Figure 7B:
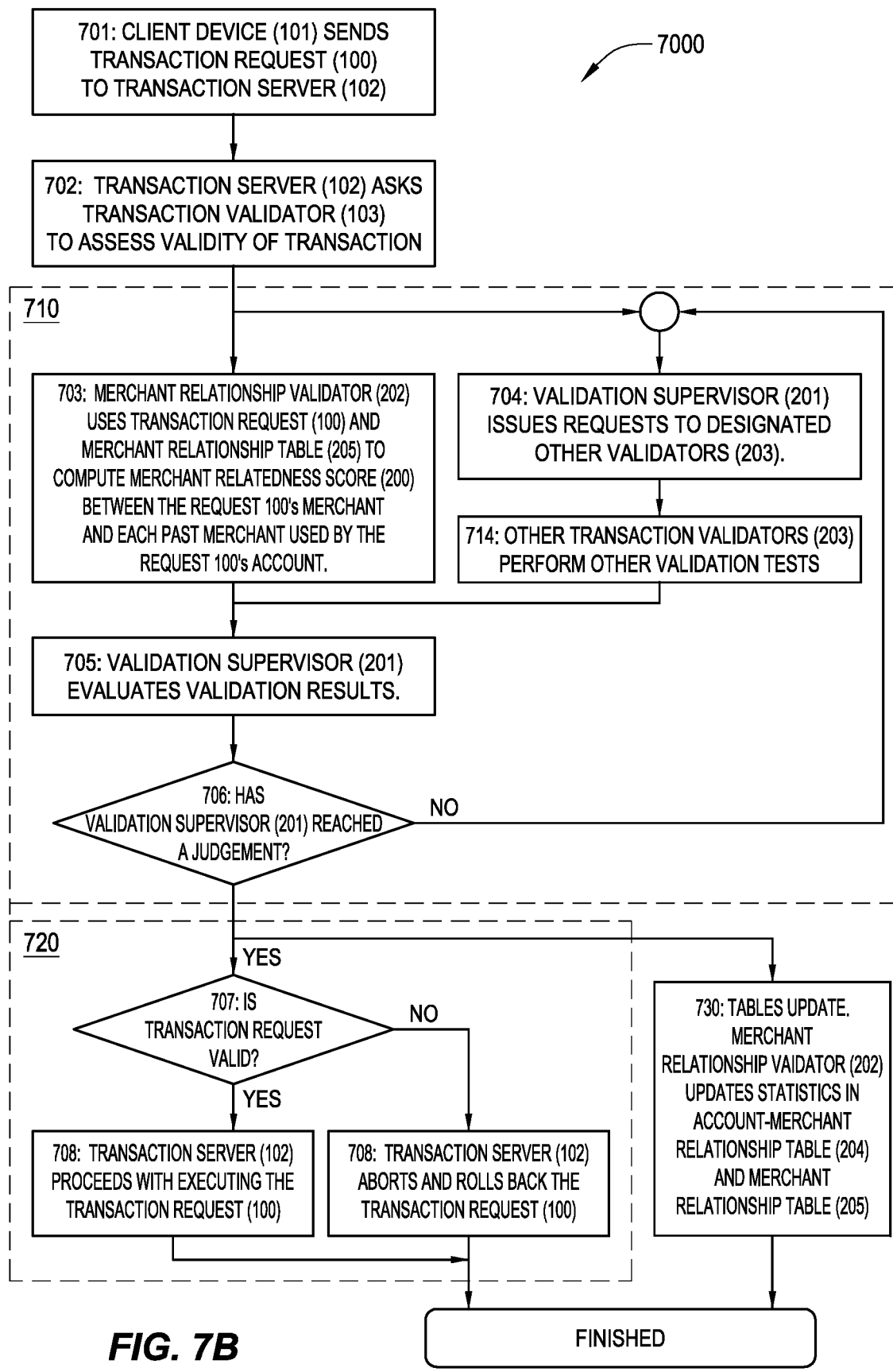
FIG. 7B is an exemplary flowchart illustrating further details of the method of validation illustrated in FIG. 7A.

With reference now to FIG. 7B, one embodiment of the validation test in step 710, the conditional execution in step 720, and the tables update in step 730 is shown in greater detail.

Turning to FIG. 7B, the validation test in step 710 (e.g., for the account fi to the merchant mx) begins when the merchant relationship validator 202 computes the cumulative relatedness between the merchant mx and the set of merchants previously used by customer account fi (step 703). In one embodiment, the merchant relationship validator 202 uses the merchant commonality 501 from the merchant relationship table 205, and optionally the amount of the transaction, to generate the merchant relatedness score 200 and sends the generated merchant relatedness score 200 to the validation supervisor 201. This step 703 is discussed in further detail below with reference to FIG. 8.

If there are other transaction validator modules 203, the validation supervisor 201 issues requests to some or all of the other optional transaction validator modules 203 (step 704). Each of the other transaction validator modules 203 reports its result as a validity score 213. The data type of the validity score 213 may be a Boolean (True or False value), or the data type may be numerical. In some embodiments, each of the validity scores 213 and the merchant relatedness score 200 has two possible values. In some embodiments, the validation supervisor 201 prioritizes the other transaction validator modules 203 such that the merchant relationship validator 202 and some transaction validator modules 203 are always used, and some other transaction validator modules 203 are used subsequently, if and only if the higher priority validation tests do not produce conclusive results. For example, if the validator prioritization aspect of the validation supervisor 201 is implemented in an imperative programming language such as C or Java, then the prioritization can be implemented by using conditional IF statements in sequence. An inconclusive validation test result could be, for example, noticing that the transaction request 100 is with a merchant in a foreign country. The cardholder may be traveling, or the card number may have been stolen.

As discussed above, the optional transaction validator modules 203 verify any aspects of the transaction request 100 other than the account-merchant relationship. Accordingly, the validation test in step 710 continues when the other optional transaction validator modules 203 perform their other validation tests and send validity scores 213 to the validation supervisor 201 (step 714). Other validation tests may include, for example, checking credit card numbers and purchaser identities against lists of known stolen cards and stolen identities.

Subsequently, in step 705, the validation supervisor 201 evaluates the received validity scores 200 and 213 and tries to reach a decision on the validity of the transaction request 100. One embodiment of the decision on the validity of the transaction request 100 in step 705 is shown in FIG. 7C.

Figure 7C:
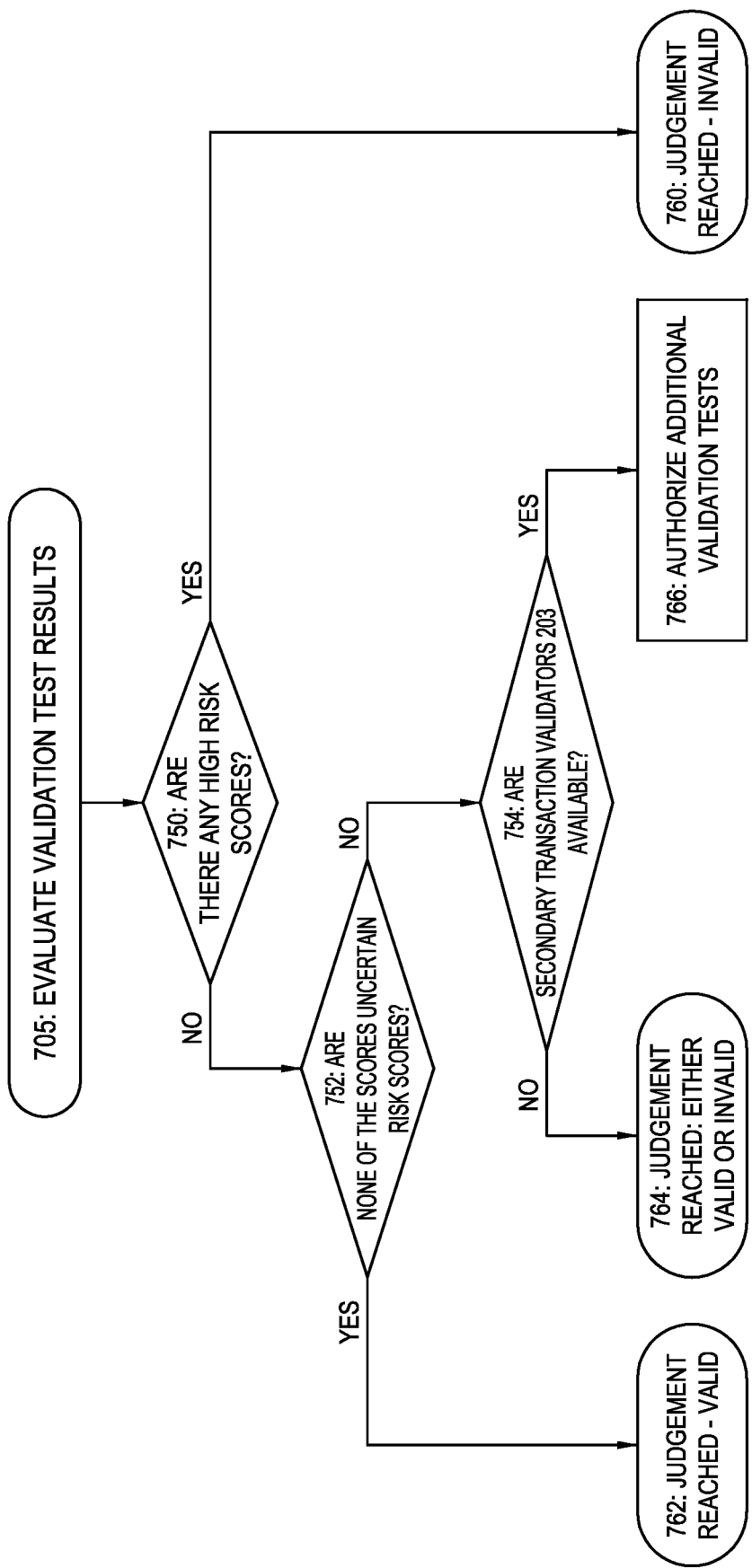
FIG. 7C is an exemplary flowchart illustrating one embodiment of the transaction validity evaluation of FIG. 7B.

With reference now to FIG. 7C, the validity scores 200 and 213 are classified by a degree of risk, for example as a high risk, a low risk, or an uncertain risk. For example, each validity score might be on a 0 to 5 point scale, where 0 or 1 is low risk, 4 or 5 is high risk, and 2 or 3 is uncertain risk. If any of the validity scores 200 and 213 is rated high risk (decision block 750), then the validation supervisor 201 determines that the transaction request 100 is "Invalid" and sends a negative validity assessment 104 (step 760). Otherwise, if none of the scores are given an uncertain risk (decision block 752), then all the validity scores 200 and 213 are determined to represent a low risk. The validation supervisor 201 determines that the transaction request 100 is "Valid" and sends a positive validity assessment 104 (step 762).

If neither of the two previous cases (from decision block 750 or decision block 752) is true, then it is the case that some of the validity scores 200 and 213 is given an uncertain risk. Then, if there are still other transaction validators 203 that have not yet returned a validity score 213 (decision block 754), then the validation supervisor 201 authorizes some or all of the remaining transaction validators 203 (step 766). However, if there are no more remaining transaction validators 203 (and there are some uncertain risk scores), then the validation supervisor 201 must use the available validity scores 200 and 213 to determine whether the transaction request 100 is "Valid" or "Invalid" (step 764). The validation supervisor 201 may use any viable decision method. Methods include having step 764 sending a positive validity assessment 104 (optimistic), having step 764 sending a negative validity assessment 104 (pessimistic), and/or having step 764 generating a random validity assessment 104 (probabilistic).

Returning to FIG. 7B, the validation test in step 710 continues by determining whether the validation supervisor 201 reached a judgment (decision block 706). If so, then the fraud detection method 7000 continues to steps 720 and 730 discussed above. However, if the validation supervisor 201 did not reach a judgment, then the validation supervisor 201 selects additional transaction validators 203 to use, looping back to step 704.

If the validity assessment 104 is positive (decision block 707), the transaction request 100 is executed (step 708). If the validity assessment 104 is negative (decision block 707), the transaction request 100 is aborted and rolled back if necessary (step 709). As stated earlier, rolling back refers to the reversal of any parts of the transaction operations requested in transaction request 100 that may have already taken place.

In step 730, the merchant relationship validator 202 uses data from the transaction request 100 to update statistics in the account-merchant relationship table 204 and merchant relationship table 205. In some embodiments, the step 730 may occur in parallel with step 720.

As discussed above, the merchant relationship validator 202 can use the edge-weighted merchant relationship graph 305 to compute the cumulative relatedness between the merchant mx and the set of merchants previously used by customer account fi in step 703. In some embodiments, the merchant relationship table 205 stores the commonality 501 between merchants for the cases of one degree of separation. The commonality score 501 takes into account only first-degree connections between merchants. That is, a first-degree connection between merchants mx and my occurs when an account has transacted with both mx and my. However, more distant relationships between merchants are possible. For example, while no single account may have transacted with both merchants m1 and m4, there may be some accounts that have transacted with both m1 and m2, and a disjoint set of accounts which have transacted with both m2 and m4. Therefore, there exists some transitive relatedness between m1 and m4. With reference to FIG. 6, three indirect connections between m1 and m4 are shown:

m1→m2→m4 (path 1)
m1→m3→m4 (path 2)
m1→m2→m3→m4 (path 3)

The merchant relationship validator 202 extracts all eligible paths from the customer Account fi's past merchants to the current merchant mx in the merchant relationship graph 305 and applies a path aggregation method, which combines all the eligible paths to produce a merchant relatedness score 200. Any path aggregation method can be used. For example, in one embodiment, the path aggregation method is as follows:

The path aggregation method comprises mathematical rules which specify, for each individual path or set of paths P between merchants mx and my, a function value f(mx, my, P). The merchant relationship score 200 for (mx, my) is equal to the function value for the collection of all eligible paths from mx to my.

To compute the merchant relationship score 200 between merchants mx and my, merchant relationship validator 202 starts by computing the function values for the individual edges which comprise the full set of eligible paths from mx to my. The merchant relationship valuator 202 continues by computing the function values for longer paths and for paths in parallel with one another, until the merchant relationship validator 202 has computed the function value for the set of all eligible paths between mx and my. To compute the function values for individual edges and for larger groupings of edges, the merchant relationship validator 202 applies the following four rules:

1. Single edge: The function value of a single edge is the edge's merchant commonality score 501. A single edge is a path collection containing one path of length 1.

2. Series aggregation: If a path collection P1(mx,my) is appended to a path collection P2(my,mz) to make a longer path collection Q(mx,mz), the function value of Q(mx,mz) is less than or equal to either the function value P2(mx,my) or the function value P2(my,mz). For example, one particular rule is Q(mx,mz)=min(P1(mx,my), P2(my,mz))−1.

3. Parallel aggregation: If a path collection P1 (mx,my) is merged with another path collection P2(mx, my) to make a larger collection P3(mx, my), then the function value P3(mx, my) is greater than or equal to either the function value P1 (mx, my) or the function value P2(mx, my). For example, one particular rule is P3(mx, my)=max(P1(mx, my), P2(mx, my))+1.

4. Maximum value for path of length 0: If a starting vertex (e.g., a past merchant of fi) is the same as the destination vertex (e.g., the current merchant mx), then this is a path with length 0. This path's function value is greater than that of any path with nonzero length. In one embodiment, the merchant relationship validator 202 first computes the function value for the aggregation of all the nonzero length paths. Then, if there is a zero length path, the merchant relatedness score 200 is set to be even higher than the function value of the set of non-zero length paths. Alternately, in another embodiment, if an account fi has previously transacted with the merchant mx, the merchant relationship validator 202 can automatically assign the transaction request 100 a very high relatedness score 200. The merchant relationship validator 202 would not need to consider any non-zero paths to compute the relatedness score 200.

As previously discussed, the merchant relationship validator 202 determines whether a path between two vertex points is an eligible path. In the preferred embodiment, all paths that are shorter than a predefined limit are eligible. Using a predetermined limit advantageously avoids an excessive number of paths. In another embodiment, only shortest paths from the start vertex to the end vertex are eligible. Longer paths are not eligible. To better understand these two embodiments for limiting the eligible paths, consider a 5-vertex graph in which every vertex has a direct connection to every other edge. The vertices in this example are A, B, C, D, and E. Because the graph is fully connected, any sequence of these five letters which begins with A and ends with B corresponds to a path between A and B. In an embodiment in which only shortest paths are eligible, then AB would be the only eligible path. In an embodiment in which all paths with up to 2 edges are eligible, than AB, ACB, ADB, and AEB are the eligible paths.

Figure 7D:
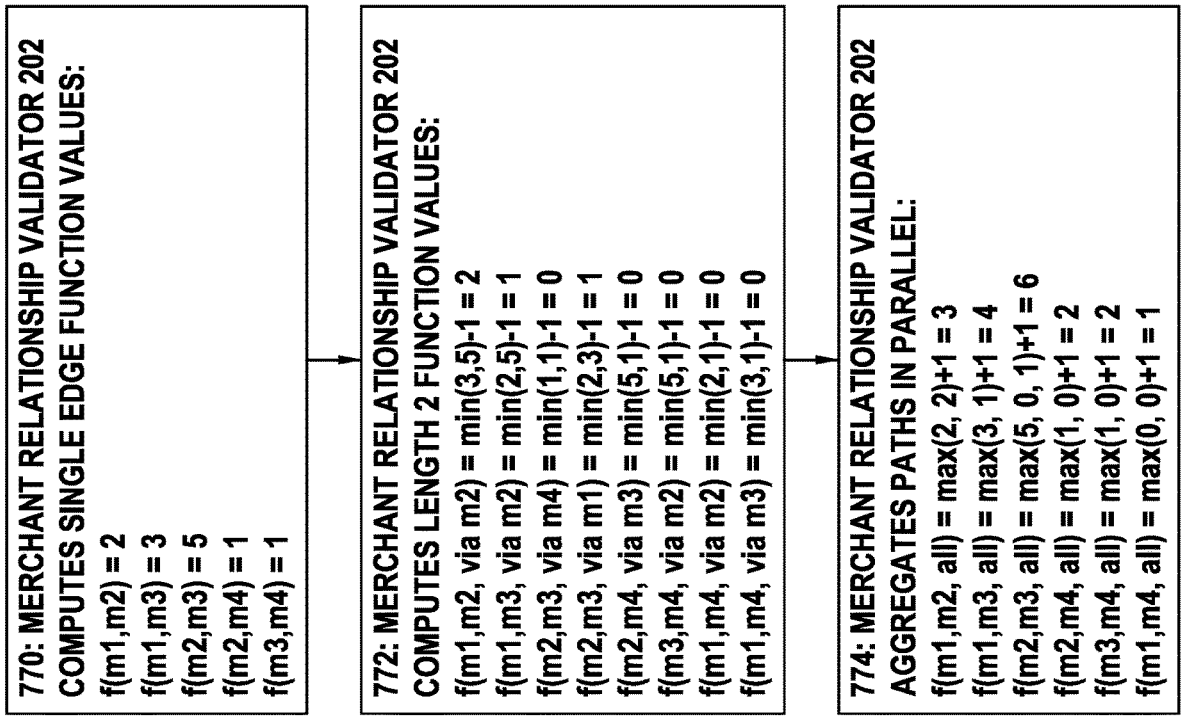
FIG. 7D is an exemplary flowchart illustrating one embodiment of a method of computing a merchant relatedness score of FIG. 2.
Figure 7D:
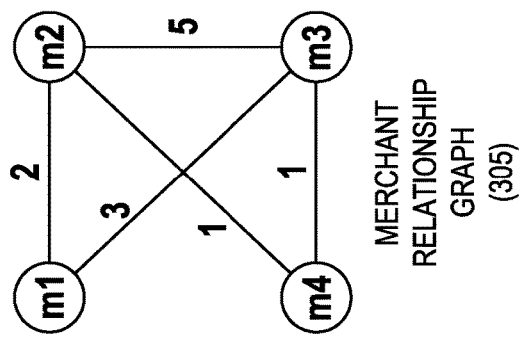

An example of the path aggregation method is illustrated in FIG. 7D. Here, the merchant relationship validator 202 computes the merchant relatedness score 200 between m1 and m4, using the merchant relationship graph 305. In step 770, the merchant relationship validator 202 computes the function values for paths of length 1. The function values are equal to the merchant commonality scores 501. In the next step 772, the merchant relationship validator 202 applies the series aggregation rule to compute the net function values for single paths of length 2. In the third step 703, the validator 202 applies the parallel aggregation rule to merge all the paths of either length 1 or length 2 between the same two vertices. For example, there are two paths of length 2 between m1 and m4, one path via m2, and another path via m3. There is no direct path. The aggregate function value f(m1, m4, all)=1. There is also a path of length 3 between m1 and m4, with relatively high commonality scores 501 on two of those three edges, but length 3 paths have not been considered yet. If the fraud detection system 1000 or the transaction request 100 has set the eligible path length limit to be 2, then the merchant relatedness score 200 computation is done. The merchant relatedness score is 1, the same as the function value for all paths between m1 and m4.

The overall path aggregation computation is analogous to determining the conductance in an electrical network. Electrical resistance—the inverse of electrical conductance—is easy to calculate and handles the special case of a zero-length path (e.g., when the account fi has transacted with the merchant mx before) by simply assigning a resistance of 0. In particular, electrical resistance follows these rules:

1. The resistance of a merchant-merchant edge is the inverse of the edge's weight.
2. When there are two parallel paths, the net resistance is the inverse of the sum of the inverses of the individual path resistances.
3. When a path consists of two subpaths in series, the net resistance is the product of the resistances of the subpaths.
4. The resistance from a point to itself is 0.

Figure 8:
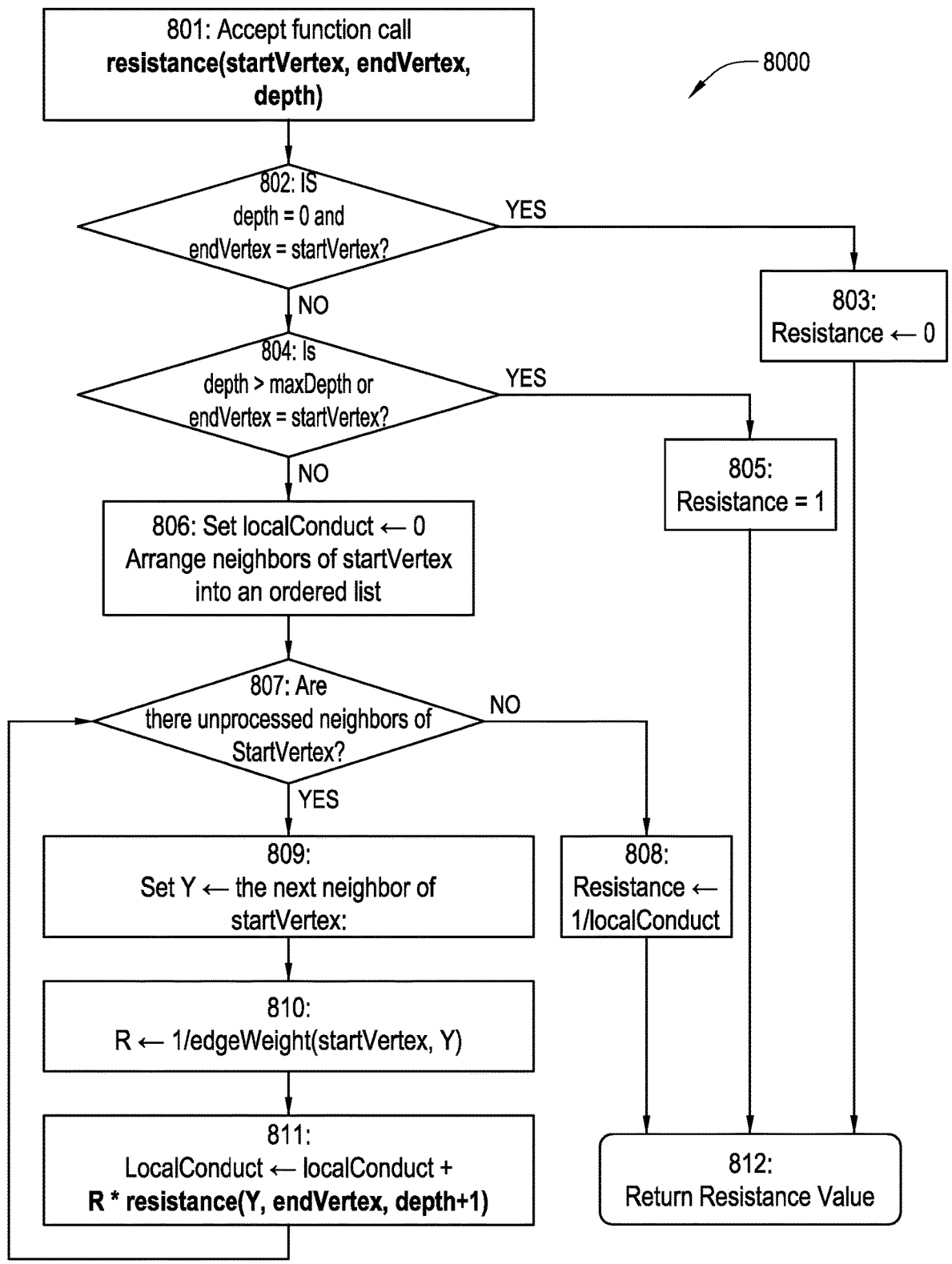
FIG. 8 is an exemplary flowchart illustrating one embodiment of a method of defining an eligible path that can be used with the validation method of FIG. 7.

FIG. 8 shows a recursive function 8000 to compute electrical resistance in a merchant-merchant network (e.g., the merchant relationship graph 305) for paths whose length is no longer than a maximum length.

In step 703 shown in FIG. 7B, the merchant relationship validator 202 uses inverse resistance as the merchant relatedness score 200. Turning to FIG. 8, the merchant relationship validator 202 initiates a resistance function 8000 with three input parameters: a startVertex, an endVertex, and a depth of 0 (step 801). If the function 8000 is initialized such that the startVertex is the same as the endVertex (decision block 802), then the merchant relationship validator 202 returns a Resistance=0 (step 803). Otherwise, if the function 8000 later reaches the endVertex (decision block 804), then the merchant relationship validator 202 returns Resistance=1 (step 805). This return value 812 will be used as a multiplication factor. Otherwise, if the startVertex is different than the endVertex, then each neighbor of the startVertex potentially forms a path to the endVertex. For each neighbor Y of the startVertex (decision block 807), the merchant relationship validator 202 calculates a path resistance as the resistance from the startVertex to Y (steps 809 and 810), multiplied by the resistance from Y to the endVertex (step 811). The total resistance is the inverse of the sum of the inverse resistance of each neighbor branch (steps 808 and 811).

In some embodiments, the merchant relationship score 200 can have a fixed range of values (e.g., from 1 to 10) or be open-ended (i.e., with either no upper limit, no lower limit, or both). One possible interpretation of the value of the merchant relationship score 200 is that higher scores indicate stronger relationship and weaker risk. Any scoring system is acceptable, as long as the merchant relationship validator 202 and the validation supervisor 201 are based on the same interpretation.

In an alternative embodiment (e.g., employing the electrical resistance analogy discussed above), a score of 0 can be interpreted as maximum relatedness while increasing values can be interpreted as weaker relatedness.

The strongest possible relationship is when the account fi in question has transacted with the merchant mx in question several times before. In the resistance network embodiment, this strong direct relationship corresponds to a resistance of 0, which can be directly assigned a merchant relationship score of 0.

The aforesaid method for computing a path aggregation value provides a method for computing the merchant relativeness score 200 between any two merchants in the merchant relationship graph 305. When the client device 101 submits a transaction request 100, what the client needs to know, however, is not a relatedness between two merchants but a fraud risk between an account and a merchant. To complete the validation test 703, the validation supervisor 202 computes not just one merchant relatedness score 200. Instead, the merchant relationship validator 202 computes a merchant relatedness score 200 between the merchant mx of the transaction request 100 and each of the merchants previously used by the account fi of the transaction request. If fi has previously transacted with fifteen merchants, then the merchant relationship validator 202 computes up to fifteen merchant relatedness scores 200.

The merchant relationship validator 202 may not need to compute fifteen scores. If one merchant's validation assessment 104 is positive, then the validation supervisor 201 can terminate the validation test 710.

Returning to FIG. 7B, in step 720 the merchant relationship validator 202 updates both the account-merchant relationship table 204 and the merchant relationship table 205. In some embodiments, the merchant relationship validator 202 first updates the account-merchant relationship table 204. The merchant relationship validator 202 queries the account-merchant relationship table 204 to see if the account-merchant relationship table 204 already contains a row for the current (fi, mx) pair. If it does, the merchant relationship validator 202 increments the transaction count attribute in that row. The merchant relationship validator 202 also updates any other data fields in that row that are affected by the new transaction. If there is no such row, then the merchant relationship validator 202 adds a row to the account-merchant relationship table 204, with an initial count of 1.

The merchant relationship validator 202 next updates the merchant relationship table 205. A transaction with mx potentially affects the commonality score 501 between mx and each other past merchant of fi.

The following section describes several embodiments for the commonality score 501 (e.g., the edge weight) between two merchants. The commonality between two merchants mx and my (as distinguished from the cumulative, transitive relatedness) can be the sum of the commonalities contributed by each financial account:

$$sim(mx,my)=\Sigma\{\text{all accounts} fi\} C\_fi(mx,my)$$

where C_fi (mx, my) is the commonality score 501 contributed by the account fi.

The number of transactions between fi and mx is notated as n(fi, mx). This number can be read directly from the account-merchant relationship table 204.

A simple commonality score 501 for one account fi is the lesser of n(fi, mx) and n(fi, my). That is, the relationship score is the lesser of the number of fi's transactions with mx and the number of fi's transactions with my. The net commonality score 501 sim(mx, my) is the sum of the account-specific relationship scores, taken over all accounts. This scoring scheme has the advantage of being simple.

The contribution from account fi is C1_fi (mx, my)=min (n(fi, mx), n(fi, my))

In an alternative embodiment, the relationship can represent an average. Specifically, whether the value n(fi, mx) is large or not is relative. One way to account for this relativity is to compare n(fi, mx) to the total number of transactions by user fi. Accordingly, the relatedness is the commonality score 501 determined above divided by the total number of transactions enacted by fi:

C2_fi (mx, my)=C1_fi (mx, my)/n(fi) where n(fi)=total number of transactions enacted by fi.

In yet another alternative, the relative importance of the number of transactions considers the total number of transactions with a given merchant. If one merchant is extremely popular, then the fact that an account has transacted with that merchant several times should not carry much significance. In this embodiment, the number of transactions with each merchant is divided by the logarithm of the total number of transactions with that merchant by any account, n(m). The logarithm is used because the range of values for n(m) can span many orders of magnitude, and the logarithm will compress the range. However, another compression function or no compression function at all can be used.

$$C3\_fi(mx,my)=\min(r(fi,mx),r(fi,my))$$

where r(f, m)=n(f, m)/log n(m)

and n(m)=total number of transactions with merchant m.

Each of the commonality score 501s above, C1_fi; C2_fi; and C3_fi, is for the contribution of a single financial account. The total direct relatedness between two merchants is computed by add the scores from each individual financial account.

In yet another alternative embodiment, the commonality score 501 between two merchants can consider each merchant as possessing a set of accounts. Accordingly, the commonality score 501 is determined by measuring the degree that these two sets overlap. For example, if F(mx) is the set of accounts which have transacted with a merchant mx, the relationship score is the number of accounts which mx and my have in common, divided by the number of accounts that mx and my each have when considered separately:

$$sim(mx,my)=|F(mx)\cup F(my)|/[|F(mx)|+|F(my)|]$$

In this embodiment, sim(mx, my) is not simply the sum of contributions from each account. On the other hand, it is necessary to compute the F(m) sets, to count their members, and to perform a set union operation. F(m) can be computed by selecting and combining the records in the account-merchant relationship table 204, which reference a particular merchant m. When the number of merchants and accounts is large, a preferred embodiment performs the computation efficiently through distributed computation. Stated in another way, the Merchant Relationship Validator 202 may contain multiple processing units, each responsible for a subset of the merchants or accounts.

Relationship Scores Using Merchant and Transaction Attributes

Figure 9:
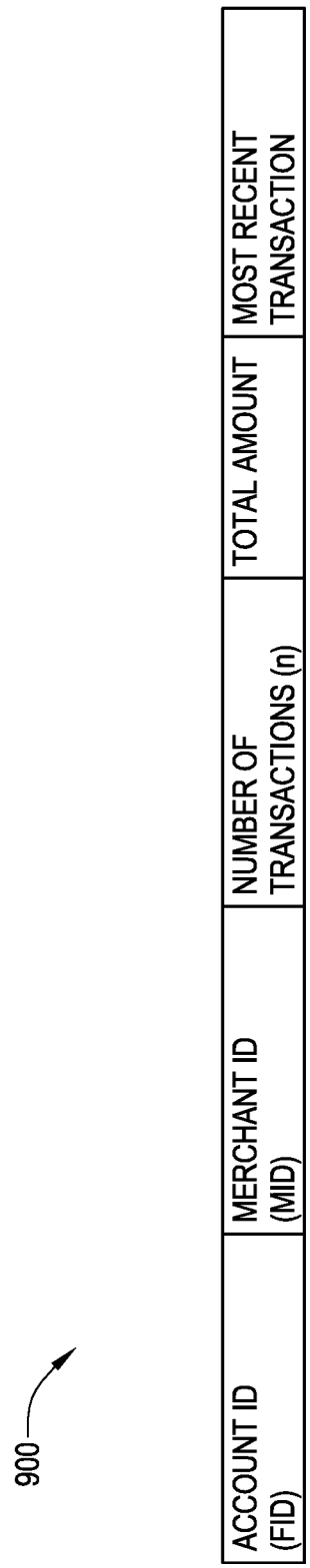
FIG. 9 is an exemplary diagram illustrating another embodiment of an account-merchant relationship table that can be stored in the transaction validator of FIG. 2

In addition to the number of transactions which share the same FID, the monetary size and the recency of shared transactions can also be useful contributors to risk assessment. In some embodiments, as show in FIG. 9, the account-merchant relationship table 204 can include columns such as illustrated in an account-merchant relationship entry 900 to record information about the size of transactions and the recency of transactions.

As an example, in one embodiment, the commonality score 501 between merchants mx and my is the total dollar amount transacted by the common accounts with those two merchants, divided by the total amount transacted by any accounts with these merchants. If amt(fi, mx) is the total amount transacted by account fi with merchant mx, and amt(mx) is the total amount transacted with merchant mx (by any account), then $$sim(mx,my)=\Sigma\{\text{each account} fi \text{ in } (F(mx)\cup F(my))\}$$
$$[amt(fi,mx)+amt(fi,my)]/[amt(mx)+amt(my)]$$

Any suitable method to record and measure transaction age or recency can be used as desired. In one embodiment, transactions are assigned a weight that decreases with age. In other embodiments, a strict time limit is specified: transactions older than a set duration are not considered at all in computing the statistics in the account-merchant relationship table 204 and in the merchant relatedness score 200. The gradual aging and the strict time limit can be applied together or independently.

In some embodiments, the relative location of merchants may be included as a risk assessment. Being close increases the strength of relationship between two merchants. If an account has previously transacted with many merchants that are physically close to the proposed merchant, then the risk may be deemed lower.

Lower and Upper Score Thresholds

If an account fi has previously transacted with N merchants and then transacts with one additional merchant, this potentially added N new entries to the merchant relationship table 205 and to its analogous merchant relationship graph 305. If N is a large number, then this is a large increase in table entries in response to one new transaction. To limit this increase, in some embodiments, a minimum threshold is set for the value of the commonality score 501. The value is only recorded in the merchant relationship table 205 if the value is at least as large as the threshold.

In some embodiments, the fraud detection system 1000 may define an upper threshold for commonality score 501, meaning that if the score is higher than this level, then the risk is considered negligible and no further computation is needed. The merchant relationship validator 202 may define a special value to represent the upper threshold. Once a merchant-merchant pair (mx, my) achieves this score, additional nonfraudulent transactions with either mx or my will not affect this score.

Alternative Method for Updating Statistics in Relationship Tables

In the embodiment disclosed with reference to FIG. 7, the account-merchant relationship table 204 and the merchant relationship table 205 are updated each time that a transaction request 100 undergoes the fraud detection method 7000.

Figure 10:
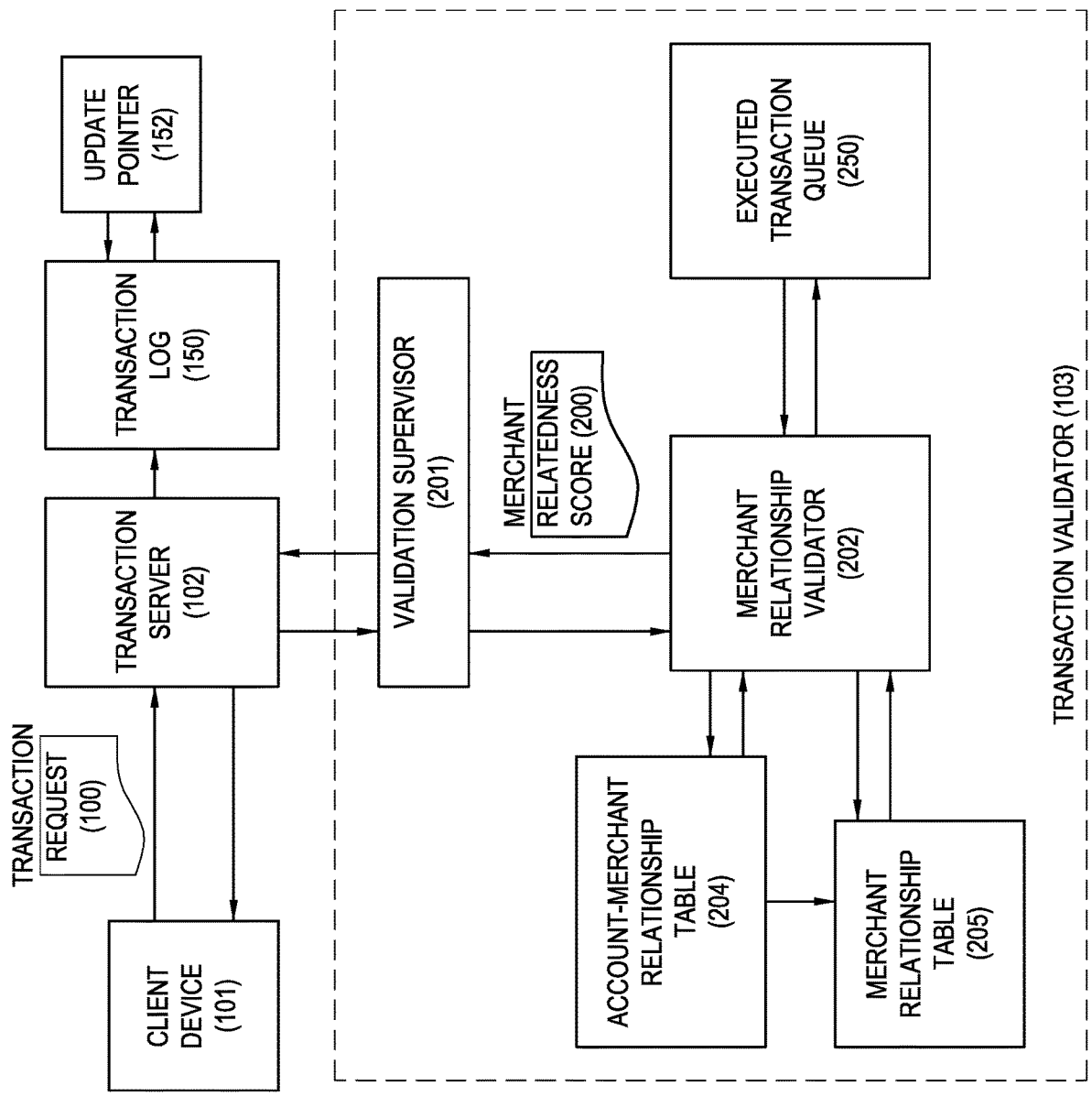
FIG. 10 is an exemplary top-level block diagram illustrating another embodiment of the transaction validator of FIG. 2 that operates with a transaction log.

Turning to FIG. 10, an alternative embodiment of the system 1000 is shown wherein the tables of the transaction validator 103 are not updated at the end of each iteration of the fraud detection method 7000. Instead, each transaction request 100 that is assessed to be valid in step 707 is added to an executed transaction queue 250 immediately after being assessed. Periodically, the merchant relationship validator 202 reads the executed transaction queue 210 in order to update the relationship tables (tables 204 and 205). The update operation is like that of the tables update in step 730, except the transaction request comes from the executed transaction queue 210 instead of being the newly received transaction request 100. After the relationship tables 204 and 205 are updated, the executed transaction queue 250 is flushed. This method, which updates tables 204 and 205 in batches of transaction queue 250 entries rather than when each transaction request 100 is received, may be more time efficient.

In an alternative embodiment, there is not a separate executed transaction queue 210. Instead, the transaction server 102 is coupled to or contains a transaction log 150, as shown in FIG. 10. As the transaction server 102 conditionally executes the transaction request, such as described in step 720 shown in FIG. 7A, the transaction request 100 is stored sequentially in the transaction log 150; each new transaction is appended to the end of the transaction log 150. Rather than having and maintaining a separate queue, this embodiment requires a single memory value, for example, an update pointer 152. The update pointer 152 records the location within the transaction log 150 of the last transaction that was used to update the account-merchant relationship table 204 and the merchant relationship table 205. Periodically, the update pointer 152 is accessed and the sequence of transactions from the location of the update pointer 152 to the most current are read and used to perform several updates to the relationship tables (tables 204 to 205). The update pointer 152 is then relocated to the end of the transaction log 104.

For example, when the fraud detection system 1000 is used for the first time, the update pointer 152 points to item 0 in the transaction log 150, because no transactions have been recorded in the relationship tables (tables 204 and 205). Suppose that after fifty transactions transpire, the validation supervisor 201 and the transaction server 102 agree to update the account-merchant relationship table 204 and the merchant relationship table 205. The fifty transaction requests are sent from the transaction log 150 to the merchant relationship validator 202. The merchant relationship validator 202 uses these transaction requests from the transaction log 150 in order to update the tables 204 and 205. The update pointer 152 is repositioned to point at item fifty in the transaction log, that is, at the point in the sequential log between those transactions that have gone through tables update in step 730 and those that have not yet.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A computer-implemented method for detecting fraudulent electronic transactions based on relationship tables modeled as a structured graph, comprising:
   receiving, by a transaction server, a transaction request from a client device that includes a financial account identifier, a merchant identifier, and a monetary amount;
   assessing, by a transaction validator of the transaction server, a validity of the transaction request based on an account merchant table of the transaction server and a merchant relationship table of the transaction server;
   conditionally executing the transaction request;
   storing sequentially, in a transaction log of the transaction server, each conditionally executed transaction request, wherein an update pointer references a location in the transaction log of a last transaction that was used to update the account merchant table and the merchant relationship table;
   determining whether to roll back said conditionally executed transaction request based on said assessed validity of the transaction request;
   updating the account merchant table and the merchant relationship table with the financial account identifier, the merchant identifier, and the monetary amount based on the update pointer and said sequentially stored conditionally executed transaction requests read from the location in the transaction log of the update pointer up to a current location in the transaction log; and
   repositioning the update pointer to reference the current transaction that was used to update the account merchant table and the merchant relationship table,
   wherein the account merchant table includes a summary of transactions between a selected financial account and a selected merchant and the merchant relationship table includes one or more relationship attributes between two or more merchants,
   wherein said assessing the validity of the transaction comprises determining, via the transaction validator, all eligible paths of the structured graph-based model of the merchant relationship table between the two or more merchants and applying a path aggregation, the eligible paths including both direct and indirect relationships between the two or more merchants,
   said applying the path aggregation comprises combining all the determined eligible paths between at least a first merchant m1 and a second merchant m2, and for each path P of the determined eligible paths, determining a function value f(m1, m2, P).

2. The computer-implemented method of claim 1, wherein said assessing the validity of the transaction request further comprises:
   computing a cumulative relatedness score between a merchant represented by the merchant identifier and a set of merchants that have transacted with the selected financial account represented by the financial account identifier; and
   determining a validity score based at least in part on any one of a comparison of a list of known stolen identities with one of the selected financial account, an account holder name, an email address, and an IP address, a comparison between a credit card number of the transaction request with a list of known stolen credit cards, and a comparison between the monetary amount with a historically typical transaction amount related to the selected financial account, wherein the validity of the transaction is based on the cumulative relatedness score and the validity score.

3. The computer-implemented method of claim 1, further comprising rolling back said conditionally executed transaction request based on said assessed validity of the transaction request.

4. The computer-implemented method of claim 1, wherein the merchant relationship table includes a commonality score between two or more merchants based at least in part on whether the selected financial account has transacted with said two or more merchants.

5. The computer-implemented method of claim 2, further comprising determining a merchant relatedness score between said two or more merchants, said assessing the validity of the transaction request being based at least in part on the merchant relatedness score.

6. The computer-implemented method of claim 5, wherein said determining the merchant relatedness score is based on an inverse resistance of a merchant relationship graph providing a graphical interpretation of the merchant relationship table.

7. The computer-implemented method of claim 5, wherein said assessing the validity of the transaction request further comprises determining a total number of transactions of the selected merchant from the account merchant table, wherein the validity of the transaction is based on a combination of the merchant relatedness score and the validity score.

8. The computer-implemented method of claim 1, wherein said assessing the validity of the transaction request further comprises defining a predetermined upper limit for said one or more relationship attributes maintained in the merchant relationship table, wherein the validity of the transaction is determined to be invalid when a selected relationship attribute exceeds the predetermined upper limit and otherwise determined to be valid when the selected relationship attribute is less than or equal to the predetermined upper limit.

9. The computer-implemented method of claim 1, further comprising maintaining a transaction queue for storing valid transaction requests, and wherein said updating the account merchant table and the merchant relationship table occurs periodically based on the maintained transaction queue.

10. A fraud detection system for detecting fraudulent electronic transactions from a client device based on relationship tables modeled as a structured graph, comprising:
   a network-connected transaction server for receiving a transaction request from the client device, the transaction request including a financial account identifier, a merchant identifier, and a monetary amount;
   a network-connected account merchant table in communication with the transaction server that maintains a summary of transactions between a selected financial account and a selected merchant;
   a network-connected merchant relationship table in communication with the transaction server that maintains one or more relationship attributes between two or more merchants; and
   a network-connected transaction validator for assessing a validity of the transaction request based on said account merchant table and said merchant relationship table, and
   wherein said transaction server conditionally executes the transaction request, stores sequentially, in a transaction log of the network-connected transaction server, each conditionally executed transaction request, wherein an update pointer references a location in the transaction log of a last transaction that was used to update the network-connected account merchant table and the network-connected merchant relationship table, and said transaction validator determines whether to roll back said conditionally executed transaction request based on said assessed validity of the transaction request,
   the assessed validity comprises determining, via the transactional validator, all eligible paths of the structured graph-based model of the merchant relationship table between the two or more merchants and applying a path aggregation, the eligible paths including both direct and indirect relationships between the two or more merchants,
   said applying the path aggregation comprises combining all the determined eligible paths between at least a first merchant m1 and a second merchant m2, and for each path P of the determined eligible paths, determining a function value f(m1, m2, P).

11. The fraud detection system of claim 10, wherein said transaction validator further:
   computes a cumulative relatedness score between a merchant represented by the merchant identifier and a set of merchants that have transacted with the selected financial account represented by the financial account identifier; and
   determines a validity score based at least in part on one of a comparison between the selected financial account and a list of known stolen identities and a comparison between a credit card number of the transaction request and a list of known stolen credit cards, wherein the validity of the transaction is based on the cumulative relatedness score and the validity score.

12. The fraud detection system of claim 10, wherein said transaction server rolls back the conditionally executed transaction request based on the assessed validity of the transaction request.

13. The fraud detection system of claim 10, wherein the merchant relationship table includes a commonality score between two or more merchants based at least in part on whether the selected financial account has transacted with said two or more merchants.

14. The fraud detection system of claim 11, wherein said transaction validator determines a merchant relatedness score between said two or more merchants, the validity of the transaction request being based at least in part on the merchant relatedness score.

15. The fraud detection system of claim 14, wherein the transaction validator determines the merchant relatedness score based on an inverse resistance of a merchant relationship graph providing a graphical interpretation of the merchant relationship table.

16. The fraud detection system of claim 14, wherein said transaction validator determines a total number of transactions of the selected merchant from the account merchant table, the validity of the transaction is based on a combination of the merchant relatedness score and the validity score.

17. The fraud detection system of claim 10, wherein said transaction validator defines a predetermined upper limit for said one or more relationship attributes maintained in the merchant relationship table, the validity of the transaction is determined to be valid when a selected relationship attribute exceeds the predetermined upper limit.

18. The fraud detection system of claim 10, wherein said transaction validator maintains a transaction queue for storing valid transaction requests, said account merchant table and said merchant relationship table being updated periodically based on the maintained transaction queue.

19. A computer-implemented method for detecting fraudulent electronic transactions from a client device based on relationship tables modeled as a structured graph, comprising:
   receiving, by a transaction server, a transaction request from the client device;
   assessing, by a transaction validator of the transaction server, a validity of the transaction request based on an account merchant table of the transaction server and a merchant relationship table of the transaction server;
   storing sequentially, in a transaction log of the transaction server, each received transaction request, wherein an update pointer references a location in the transaction log of a last transaction that was used to update the account merchant table and the merchant relationship table;

updating the account merchant table and the merchant relationship table with the transaction request based on the update pointer and said sequentially stored conditionally executed transaction requests read from the location in the transaction log of the update pointer up to a current location in the transaction log; and repositioning the update pointer to reference the current transaction that was used to update the account merchant table and the merchant relationship table, wherein the account merchant table includes a summary of transactions between a selected financial account and a selected merchant and the merchant relationship table includes one or more relationship attributes between two or more merchants, wherein said assessing the validity of the transaction comprises determining, via the transaction validator, all eligible paths of the structured graph-based model of the merchant relationship table between the two or more merchants and applying a path aggregation, the eligible paths including both direct and indirect relationships between the two or more merchants, said applying the path aggregation comprises combining all the determined eligible paths between at least a first merchant m1 and a second merchant m2, and for each path P of the determined eligible paths, determining a function value f(m1, m2, P).

20. The computer-implemented method of claim 19, wherein said assessing the validity of the transaction request further comprises:

computing a cumulative relatedness score between a merchant included in the transaction request and a set of merchants that have transacted with a selected financial account included in the transaction request; and determining a validity score based at least in part on one of a comparison between the selected financial account and a list of known stolen identities and a comparison between a credit card number of the transaction request and a list of known stolen credit cards, wherein the validity of the transaction is based on the cumulative relatedness score and the validity score.

* * * * *